(12) United States Patent
Alrabadi

(10) Patent No.: US 10,341,831 B2
(45) Date of Patent: Jul. 2, 2019

(54) SYSTEM AND METHOD FOR POWER-EFFICIENT IOT DEVICES

(71) Applicant: QUALCOMM Incorporated, San Diego, CA (US)

(72) Inventor: Osama Nafeth Saleem Alrabadi, Frankfurt (DE)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 15/604,224

(22) Filed: May 24, 2017

(65) Prior Publication Data

US 2018/0343536 A1 Nov. 29, 2018

(51) Int. Cl.
| | |
|---|---|
| H04L 5/14 | (2006.01) |
| H04W 4/70 | (2018.01) |
| H04L 29/08 | (2006.01) |
| H04L 27/18 | (2006.01) |
| H04W 52/02 | (2009.01) |

(52) U.S. Cl.
CPC ............ H04W 4/70 (2018.02); H04L 27/18 (2013.01); H04L 67/12 (2013.01); H04W 52/0209 (2013.01)

(58) Field of Classification Search
None
See application file for complete search history.

(56) References Cited

U.S. PATENT DOCUMENTS

2011/0201283 A1* 8/2011 Lorenz ................ H04B 7/0617
455/78
2016/0164466 A1* 6/2016 Briffa ..................... H03F 3/19
330/295

OTHER PUBLICATIONS

EP Tsakalaki, ON Alrabadi, A Kalis, CB Papadias, R Prasad, "Non cooperative space-time communication for energy efficiency in sensor networks", IEEE Transactions on Communications 60 (1), 48-54.
ON Alrabadi, CB Papadias, A Kalis, R Prasad, "A universal encoding scheme for MIMO transmission using a single active element for PSK modulation schemes", IEEE Transactions on Wireless Communications 8 (10), 5133-5142.
ON Alrabadi, J Perruisseau-Carrier, A Kalis, "MIMO transmission using a single RF source: theory and antenna design", IEEE Transactions on antennas and propagation 60 (2), 654-664.
ON Alrabadi, C Divarathne, P Tragas, A Kalis, N Marchetti, CB Papadias,, "Spatial multiplexing with a single radio: Proof-of-concept experiments in an indoor environment with a 2.6-GHz prototype", IEEE Communications Letters 15 (2), 178-180.

(Continued)

*Primary Examiner* — Kouroush Mohebbi
(74) *Attorney, Agent, or Firm* — Linda G. Gunderson; Patterson & Sheridan

(57) ABSTRACT

Certain aspects of the present disclosure provide apparatus and methods for emulating the Alamouti structure or a similar space-time block code using a single RF chain. A UE may include a RF chain, at least one switching circuit, at least one analog modulator circuit, and a first and second antenna. The output of a RF chain may be coupled to an input of a switching circuit, the output of the switching circuit may be coupled to an input of a first analog modulator circuit, and the output of the first analog modulator circuit coupled to a first and second antenna. A hybrid coupler is one example of an analog modulator circuit.

18 Claims, 8 Drawing Sheets

(56) References Cited

OTHER PUBLICATIONS

ON Alrabadi, CB Papadias, A Kalis, N Marchetti, R Prasad, "Spatial multiplexing via antenna switching", IEEE Communications Letters 13 (8), 594-596.

M Yousefbeiki, J Perruisseau-Carrier, "Towards compact and frequency-tunable antenna solutions for MIMO transmission with a single RF chain", IEEE Transactions on Antennas and Propagation 62 (3), 1065-1073.

* cited by examiner

SYSTEM AND METHOD FOR POWER-EFFICIENT IOT DEVICES

TECHNICAL FIELD

Certain aspects of the present disclosure generally relate to power efficient analog modulator circuits used, for example, in a wireless communication device.

INTRODUCTION

Wireless communication networks are widely deployed to provide various communication services such as telephony, video, data, messaging, broadcasts, and so on. Such networks, which are usually multiple access networks, support communications for multiple users by sharing the available network resources. A wireless communication network may include a number of base stations that can support communication for a number of mobile stations. A mobile station (MS) may communicate with a base station (BS) via a downlink and an uplink.

Some MSs may be considered Internet-of-Things (IoT) devices. IoT allows objects to be sensed or controlled remotely across existing network infrastructure. This results in improved efficiency and reduced human intervention. IoT devices need to be power-efficient while maintaining low hardware complexity. For this reason, IoT devices may include a single radio frequency (RF) chain, especially at a transmit side, as power amplifiers may consume a large amount of power.

Since IoT devices do not require high data rates, a MS's power-efficiency can be enhanced by utilizing low modulation order schemes. Power efficiency may also be achieved via redundant transmission of the same signal (e.g., transmission time interval (TTI)-bundling in modulated signals). However, further power transmission reduction is desirable.

SUMMARY

Certain aspects of the present disclosure generally relate to emulating the Alamouti space-time block code or other similar space-time block codes (STBCs) in a wireless device including a single transmit RF chain. As described herein, an analog modulator circuit, such as, for example, a hybrid coupler, coupled to a smart switcher is used to advantageously enhance the block error rate (BLER) of a wireless device having a single transmit RF chain while enabling the performance of the device to be comparable to a device equipped with two transmit RF chains. As described herein, a smart switcher, analog modulator circuit, and two antennas at the wireless device are used to save power at the wireless device. According to another example, two smart switchers, each coupled to a respective analog modulator circuit, may be used to save power at a UE.

Certain aspects of the present disclosure provide an apparatus for wireless communication. The apparatus includes a radio frequency (RF) chain, a switching circuit, wherein an output of the RF chain is coupled to an input of the switching circuit, a first analog modulator circuit, wherein an output of the switching circuit is coupled to an input of the first analog modulator circuit, and a first and second antennae coupled to an output of the first analog modulator circuit.

Certain aspects of the present disclosure provide a method for wireless communication by a user equipment (UE). The method generally includes determining whether a first bit modulated into a constellation symbol of a modulation scheme equals a second bit modulated into a second constellation symbol of the modulation scheme, and based, at least in part, on the determination, coupling an output of a radio frequency (RF) chain of the UE to one of first or second input ports of an analog modulator circuit of the UE in each of a first and second time period.

Certain aspects of the present disclosure provide an apparatus for wireless communication by a user equipment (UE). The apparatus generally includes means for determining whether a first bit modulated into a constellation symbol of a modulation scheme equals a second bit modulated into a second constellation symbol of the modulation scheme, and based, at least in part, on the determination, means for coupling an output of a radio frequency (RF) chain of the UE to one of first or second input ports of an analog modulator circuit of the UE in each of a first and second time period.

Certain aspects of the present disclosure provide an apparatus for wireless communication by a user equipment (UE). The apparatus generally includes at least one processor and memory coupled to the at least one processor. The at least one processor is generally configured to determine whether a first bit modulated into a constellation symbol of a modulation scheme equals a second bit modulated into a second constellation symbol of the modulation scheme, and based, at least in part, on the determination, couple an output of a radio frequency (RF) chain of the UE to one of first or second input ports of an analog modulator circuit of the UE in each of a first and second time period.

Certain aspects of the present disclosure provide a computer readable medium for wireless communication by a user equipment (UE) having instructions stored thereon for determining whether a first bit modulated into a constellation symbol of a modulation scheme equals a second bit modulated into a second constellation symbol of the modulation scheme, and based, at least in part, on the determination, coupling an output of a radio frequency (RF) chain of the UE to one of first or second input ports of an analog modulator circuit of the UE in each of a first and second time period.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
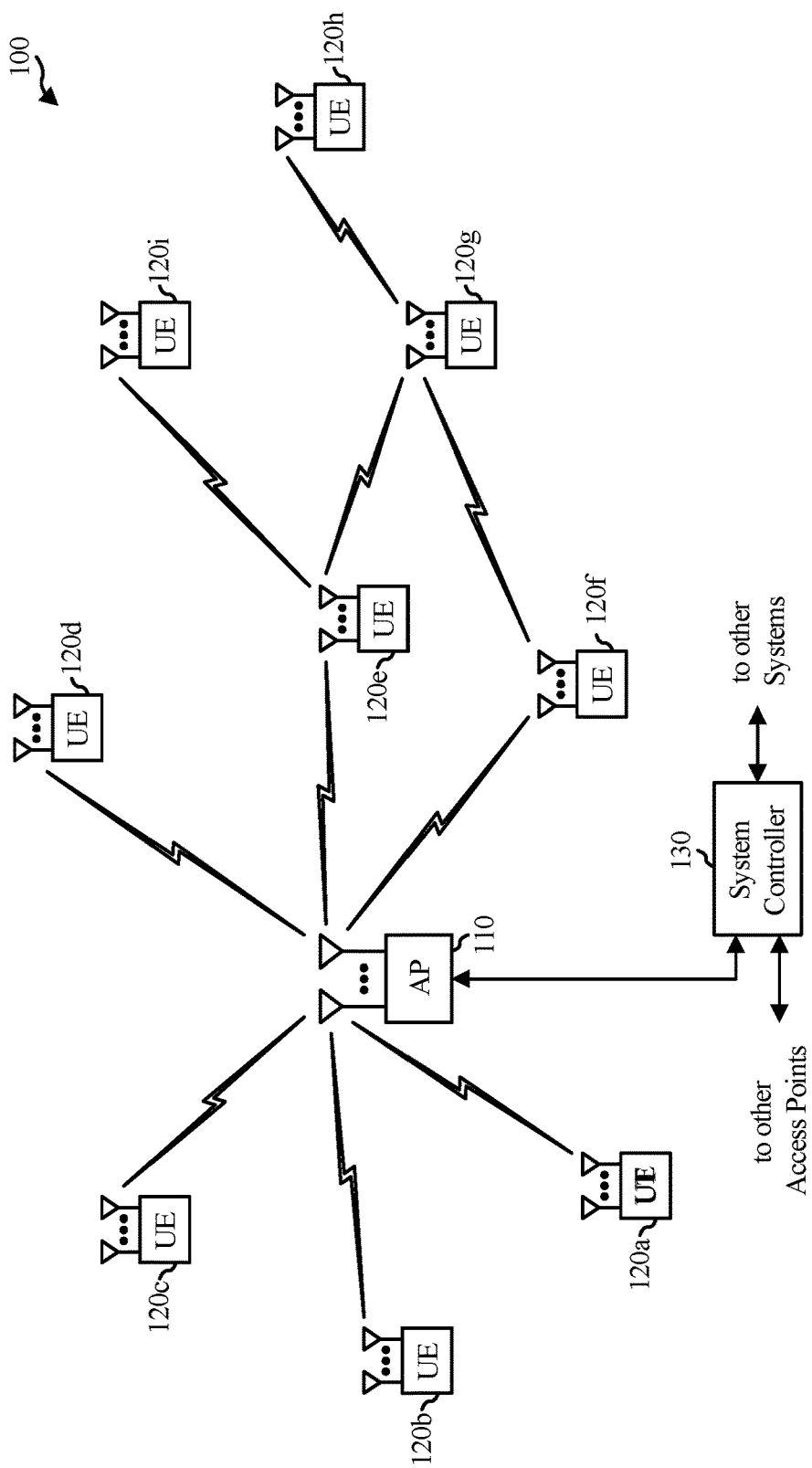
FIG. 1 is a diagram of an example wireless communications network, in accordance with certain aspects of the present disclosure.

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals (e.g., UEs) can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. A TDMA network may implement a radio technology such as Global System for Mobile Communications (GSM). An OFDMA network may implement a radio technology such as NR (e.g. 5G RA), Evolved UERA (E-UERA), Ultra Mobile Broadband (UMB), IEEE 802.11 (Wi-Fi), IEEE 802.16 (WiMAX), IEEE 802.20, Flash-OFDMA, etc. UERA and E-UERA are part of Universal Mobile Telecommunication System (UMTS). NR is an emerging wireless communications technology under development in conjunction with the 5G Technology Forum (SGTF). 3GPP Long Term Evolution (LTE) and LTE-Advanced (LTE-A) are releases of UMTS that use E-UERA. UERA, E-UERA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including new radio (NR) technologies.

NR, for example 5G, is an example of an emerging telecommunication standard. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

An Example Wireless System

Certain aspects of the present disclosure provide techniques and apparatus to achieve transmit power reduction by exploiting the Alamouti signal structure or any other similar STBC while utilizing a single RF transmit chain at a UE.

As described herein, an analog modulator circuit, such as, for example, a hybrid coupler, coupled to a smart switcher is used to advantageously enhance the block error rate (BLER) of a wireless device having a single transmit RF chain while enabling the performance of the device to be comparable to a device equipped with two transmit RF chains. Power saving may thus be achieved by a wireless device including a smart switcher, analog modulator circuit, single transmit RF chain, and two antennas.

For illustrative purposes, aspects are described with reference to a hybrid coupler; however, any analog modulator circuit can be used to achieve the power saving described herein. For example, any circuit that provides power-splitting and phase shifting used for binary phase-shift keying (BPSK) or quadrature phase shift keying (QPSK) can be used in accordance with the described techniques and apparatuses.

A UE may include a single RF chain coupled to an input of a switching circuit. An output of the switching circuit may be coupled to an input of a first analog modulator circuit. An output of the analog modulator circuit may be coupled to first and second antennae.

The analog modulator circuit may include a first and second input port. The switching circuit may be configured to selectively and intelligently couple the output of the single RF chain to either the first or second input port of the analog modulator circuit. As an example, based on whether a first bit modulated into a constellation symbol of a modulation scheme equals a second bit modulated into a second constellation symbol of the modulation scheme, the switching circuit may couple the output of the RF chain to one of the first or second input port. According to this example, the modulation scheme may be a BPSK modulation scheme.

Similarly, according to an example, the wireless device's single RF chain may also be coupled to a second switching circuit (for example, as will be further described with reference to FIG. 9). An output of the second switching circuit may be coupled to an input of a second analog modulator circuit. The output of the second analog modulator circuit may be coupled to the first and second antennae (the same first and second antennae coupled to the output of the first analog modulator circuit). The first analog modulator circuit may be used for the in-phase signal and the second analog modulator circuit may be used for the quadrature-phase signal. According to this example, each of the in-phase signal and the quadrature-phase signal may be BPSK modulated, resulting in a QPSK signal.

FIG. 1 illustrates a wireless communications system 100 with access points 110 and user equipments (UEs) 120, in which aspects of the present disclosure may be practiced. For simplicity, only one access point 110 is shown in FIG. 1. An access point (AP) is generally a fixed station that communicates with the UEs and may also be referred to as a base station (BS), an evolved Node B (eNB), transmit/receive point (TRP), a next generation Node B (gNB), Node B, or some other terminology.

UE 120 may be dispersed throughout wireless network 100, and each UE may be stationary or mobile. A UE may also be referred to as an access terminal (AT), a terminal, a mobile station (MS), a subscriber unit, a station (STA), a user terminal (UT), etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, an appliance, an automobile, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A component in a network (e.g., wireless node) may provide, for example, connectivity for or to the network (e.g., a wide area network such as Internet or a cellular network) via a wired or wireless communication link. Some UEs may be considered IoT devices. Some UEs may be considered a Customer Premises Equipment (CPE).

Access point 110 may communicate with one or more UEs 120 at any given moment on the downlink and uplink. The downlink (i.e., forward link) is the communication link from the access point to the UEs, and the uplink (i.e., reverse link) is the communication link from the UEs to the access point. A UE may also communicate peer-to-peer with another UE. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected UE 120 may receive downlink transmissions and transmit uplink transmissions. Each selected UE transmits user-specific data to and/or receives user-specific data from the access point. In general, each selected UE may be equipped with one or multiple antennas (i.e., $N_{ut} \geq 1$). The $N_u$ selected UE can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each UE 120 may be equipped with a single antenna (e.g., in order to keep costs down) or multiple antennas (e.g., where additional costs can be supported).

Figure 2:
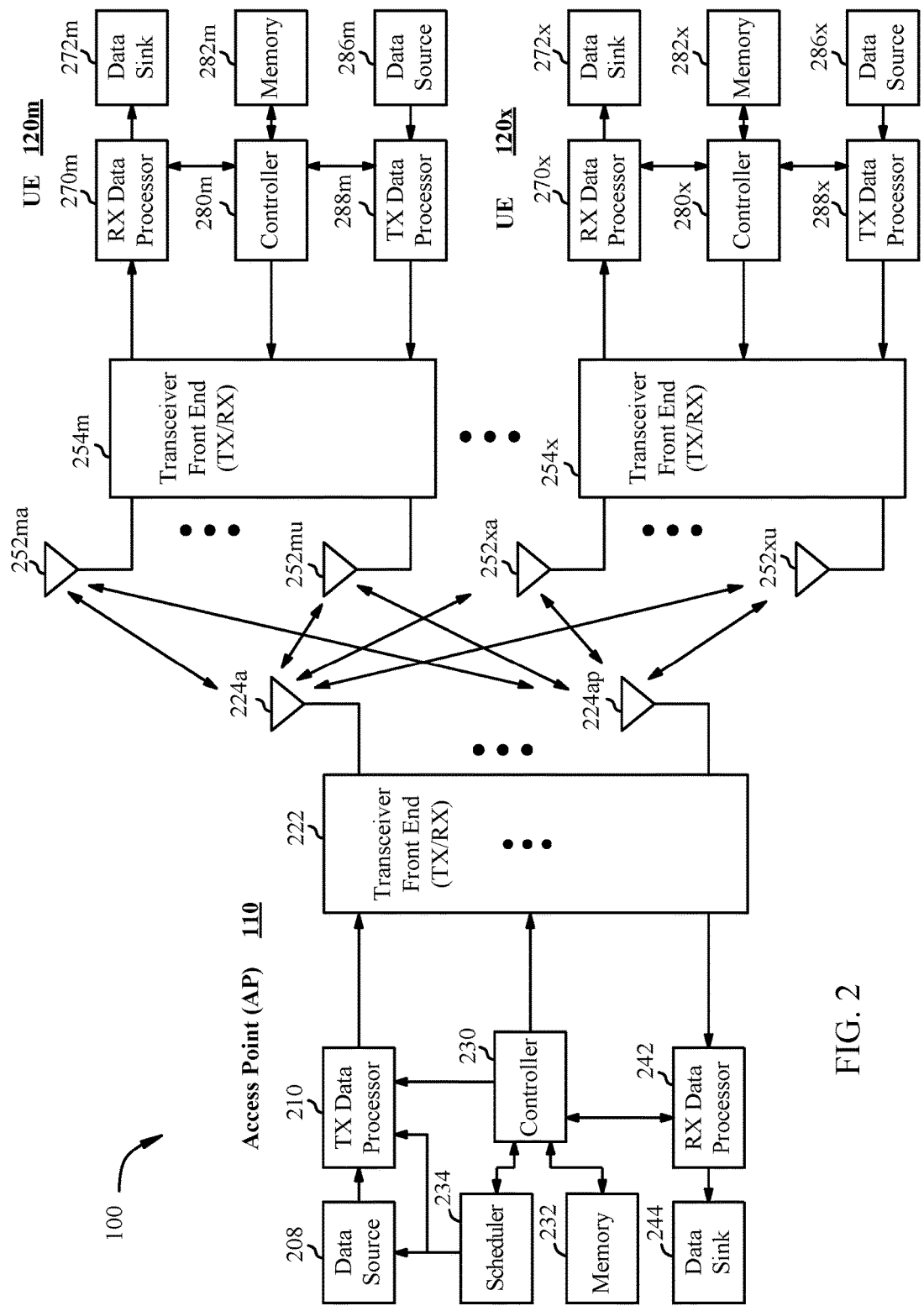
FIG. 2 is a block diagram of an example access point (AP) and example UEs, in accordance with certain aspects of the present disclosure.

FIG. 2 shows a block diagram of access point 110 and two UE 120m and 120x in wireless system 100. Access point 110 is equipped with $N_{ap}$ antennas 224a through 224ap. UE 120m is equipped with $N_{ut,m}$ antennas 252ma through 252mu, and UE 120x is equipped with $N_{ut}$ antennas 252xa through 252xu. Access point 110 is a transmitting entity for the downlink and a receiving entity for the uplink. Each UE 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, and the subscript "up" denotes the uplink. $N_{up}$ UEs are selected for simultaneous transmission on the uplink, and $N_{dn}$ UEs are selected for simultaneous transmission on the downlink $N_{up}$ may or may not be equal to $N_{dn}$, and $N_{up}$ and $N_{dn}$ may be static values or can change for each scheduling interval. Beam-steering or some other spatial processing technique may be used at the access point and UE.

On the uplink, at each UE 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the UE based on the coding and modulation schemes associated with the rate selected for the UE and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the UE 120 and may interface with the controller 280.

A number $N_{up}$ of UEs 120 may be scheduled for simultaneous transmission on the uplink. Each of these UEs transmits its set of processed symbol streams on the uplink to the access point.

At access point 110, $N_{ap}$ antennas 224a through 224ap receive the uplink signals from all $N_{up}$ UEs transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the UE's transceiver front end 254 and provides a recovered uplink data symbol stream. The recovered uplink data symbol stream is an estimate of a data symbol stream $\{s_{up}\}$ transmitted by a UE. An RX data processor 242 processes (e.g., demodulates, deinterleaves, and decodes) the recovered uplink data symbol stream in accordance with the rate used for that stream to obtain decoded data. The decoded data for each UE may be provided to a data sink 244 for storage and/or a controller 230 for further processing.

On the downlink, at access point 110, a TX data processor 210 receives traffic data from a data source 208 for $N_{dn}$ UEs scheduled for downlink transmission, control data from a controller 230 and possibly other data from a scheduler 234. The various types of data may be sent on different transport channels. TX data processor 210 processes (e.g., encodes, interleaves, and modulates) the traffic data for each UE based on the rate selected for that UE. TX data processor 210 may provide downlink data symbol streams for one or more of the $N_{dn}$ UEs to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each UE 120, $N_{ut,m}$ antennas 252 receive the downlink signals from access point 110. For receive diversity at the UE 120, the transceiver front end 254 may select signals received from one of the antennas 252 for processing. The signals received from multiple antennas 252 may be combined for enhanced receive diversity. The UE's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the UE.

In certain aspects, the transceiver front end 254 may include a smart switching circuit and at least one analog modulator circuit. According to aspects, the transceiver front end 254 may include two smart switching circuits, each of which may be coupled to an analog modulator circuit. The outputs of both analog modulator circuits may be coupled to a first and second antenna at the UE.

The techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

Figure 3:
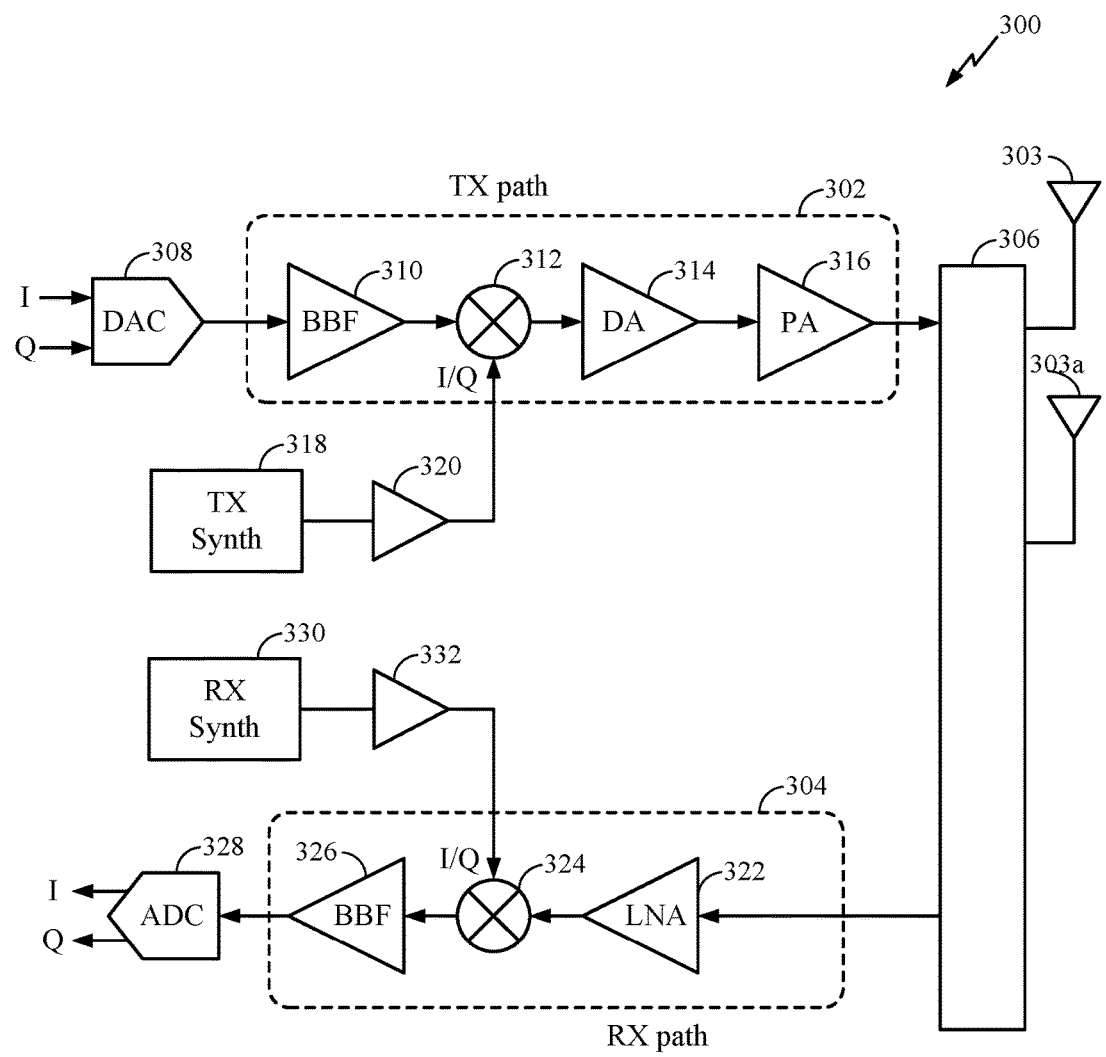
FIG. 3 is a block diagram of an example transceiver front end, in accordance with certain aspects of the present disclosure.

FIG. 3 is a block diagram of an example transceiver front end 300, which may be the same as or similar to transceiver front ends 222, 254 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

Figure 8:
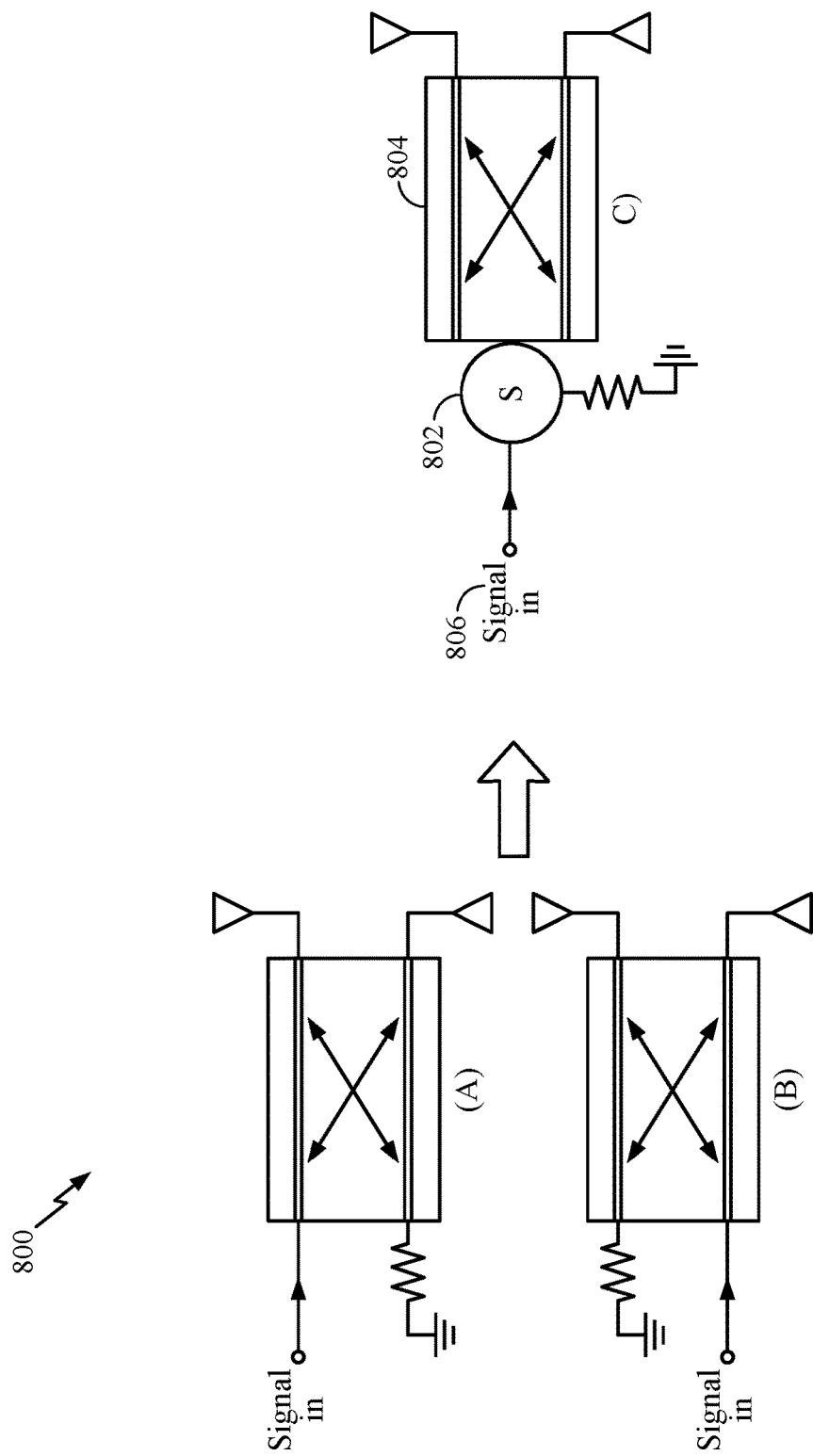
FIG. 8 illustrates an example implementation of a power efficient IoT device, according to aspects of the present disclosure.

According to aspects described herein, the interface 306 may include at least one smart switching circuit and at least one analog modulator circuit. An example switching circuit and analog modulator circuit is shown in FIG. 8 (switching circuit 802, analog modulator circuit 804) and described in more detail below.

Figure 6:
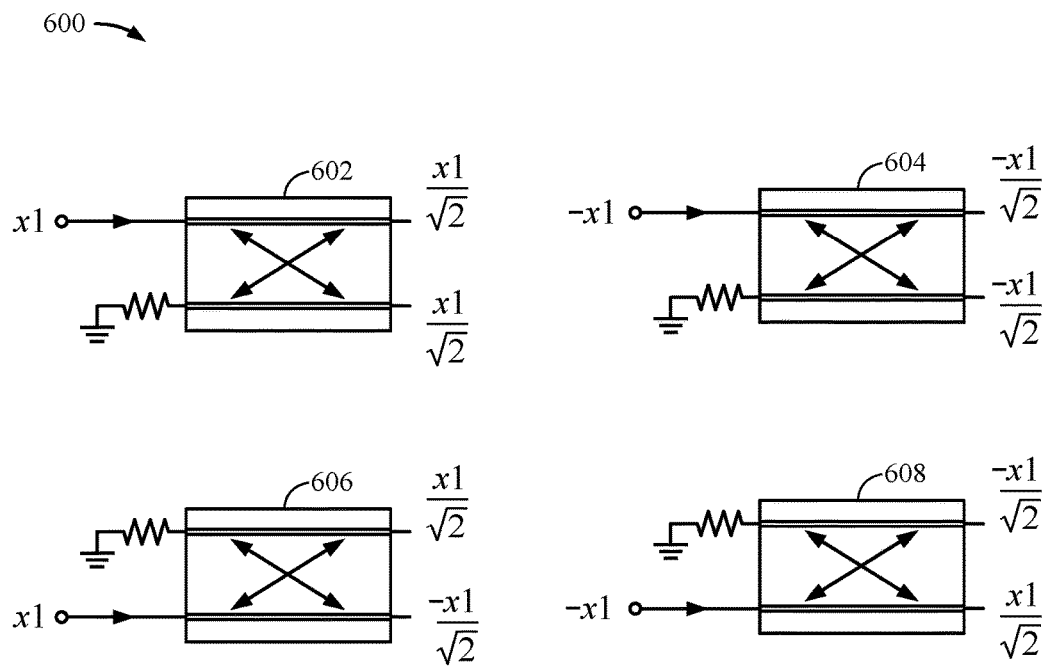
FIG. 6 illustrates example inputs and outputs for a hybrid coupler.

The one or more analog modulator circuits may be coupled to a first antenna 303 and a second antenna 303a. A first switching circuit may route a signal from the single transmit path 302 (e.g., signal 806 in FIG. 8) to one of a first or second port of the analog modulator circuit in a first time period. The other port may be terminated. Stated otherwise, the other port may be coupled to a reference potential (e.g., electrical ground, which is illustrated in FIG. 6). In a later time period, the first switching circuit may route a second signal to one of the first or second port of the analog modulator circuit. The other port may be terminated. The smart switcher thus described may allow transmit power reduction by the UE while using a single RF chain 302.

According to aspects, the interface 306 may include a second analog modulator to transmit, for example, a QPSK symbol. According to this example, the first switching circuit may control a first analog modulator circuit and a second switching circuit may control a second analog modulator circuit.

Figure 9:
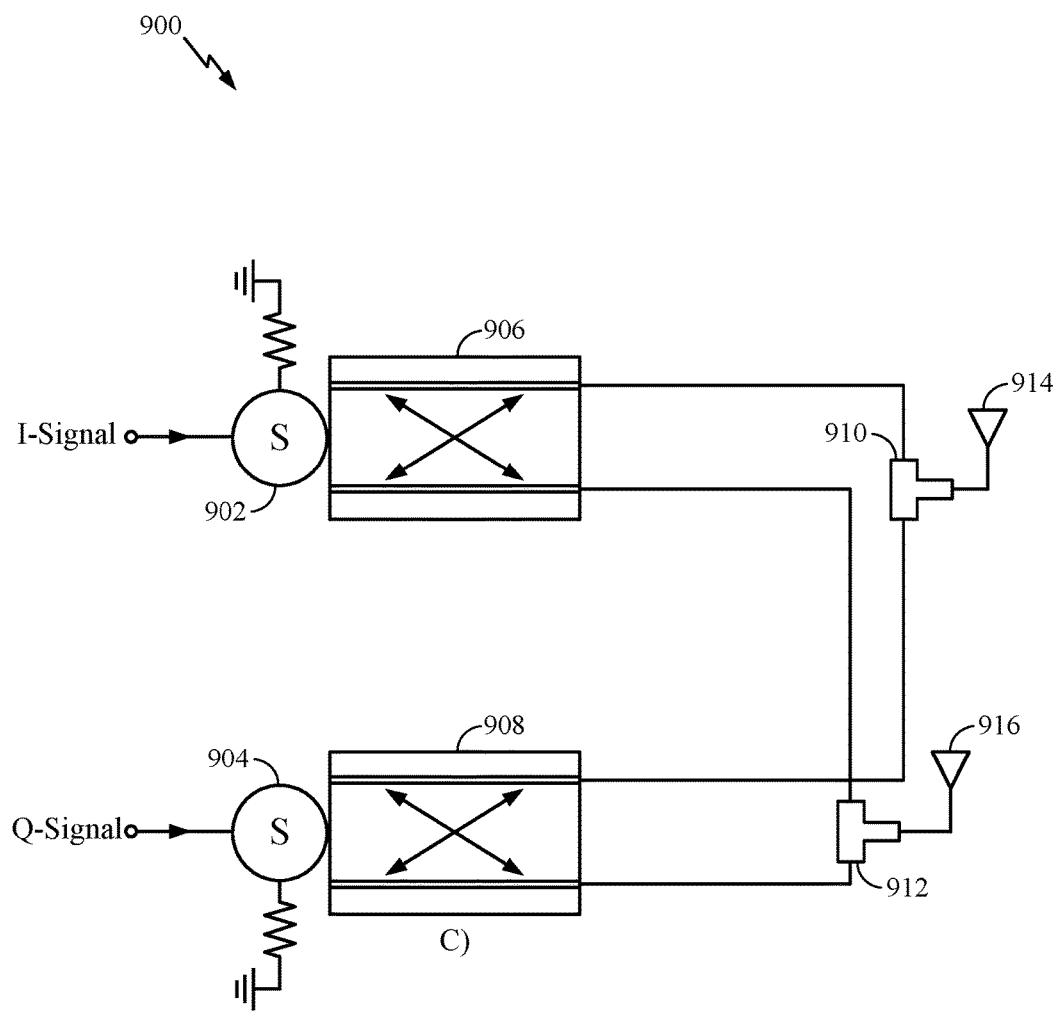
FIG. 9 illustrates an example implementation of a power efficient IoT device, according to aspects of the present disclosure.

An example of the a UE having a first switching circuit configured to control the first analog modulator and having a second switching circuit configured to control the second analog modulator is illustrated in FIG. 9 (first switching circuit 902, first analog modulator 906, second switching circuit 904, and second analog modulator 908) and described in more detail below.

The first switching circuit may receive an in-phase component of the RF signal (for example, an in-phase component of the output of the single RF transmit chain 302, "I-Signal" as illustrated in FIG. 9). The second switching circuit may receive a quadrature phase component of the RF signal (for example, a quadrature phase component of the output of the single RF transmit chain 302, "Q-Signal" as illustrated in FIG. 9). As shown in FIG. 9, a first output of the first analog modulator may be coupled to a first output of the second analog modulator. A second output of the first analog modulator may be coupled to a second output of the second analog modulator. Each of the combined outputs may be coupled to an antenna (for example 303 and 303a in FIGS. 3, 914 and 916 in FIG. 9). Therefore, in each time period, a QPSK symbol may be generated.

The smart switching circuit thus described may allow transmit power reduction by the UE while using a single RF chain 302.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303 (and/or antenna 303a).

The RX path 304 may include a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies indicates using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 318, which may be buffered or amplified by amplifier 320 before being mixed with the baseband signals in the mixer 312. Similarly, the receive LO may be produced by an RX frequency synthesizer 330, which may be buffered or amplified by amplifier 332 before being mixed with the RF signals in the mixer 324.

Example System and Method for Power-Efficient IoT Devices

The Internet of Things (IoT) is a network of physical objects or "things" embedded with, e.g., electronics, software, sensors, and network connectivity, which enable these objects to collect and exchange data. IoT allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

It is desirable for IoT devices to be power-efficient while maintaining low hardware complexity. Accordingly, IoT UEs may be simple devices having a single RF transmit chain. Since high data rates are not necessary for IoT devices, power efficiency at an IoT UE may be enhanced by using a low modulation and coding scheme. Additionally or alternatively, power savings may be achieved by exploiting the Alamouti signal structure while using a single RF transmit chain.

According to the techniques described herein, the performance of a UE having a single transmit RF chain may be comparable to a UE equipped with two transmit RF chains. The UE may have a second antenna, but not a second transmit RF chain, and may have at least one smart switching circuit. The BLER gain of such a UE may translate to power saving by reducing (e.g., backing off) the transmit power of the two-antenna, single-RF chain UE, to a level similar to a single-antenna, single-RF chain device. Through antenna switching, the UE may emulate the Alamouti structure and save transmit power. Aspects of the present disclosure emulate the Alamouti STBC using a single transmit RF chain, wherein the RF chain may include, for example, a mixer and a power amplifier as illustrated in FIG. 3.

Previous methods to emulate the Alamouti STBC include modulating a second spatial layer directly into the transmit antenna system, for example, via passive antenna load switching. Unfortunately, antenna modulation-based methods may be based on symmetric antennas that ideally remain in isolation from nearby coupling effects. In this way, the symmetric antennas may remain mirror images of each other. However, symmetric antennas that remain in isolation from nearby coupling effects may not be realistic, for example, because IoT devices may be located nearly anywhere. Thus, a user's hand, head, or any nearby object may have a non-symmetric coupling effect with the antenna system. Accordingly, the modulation of the second spatial layer may suffer from phase modulation error. This phase modulation error may translate into an error vector magnitude exceeding a threshold value.

In an effort to avoid having the electromagnetic antenna system itself performing the modulation of the second spatial layer, according to aspects of the present disclosure, the modulation occurs in the RF path, before the antenna system (e.g., the first and second antenna). In this manner, the mutual coupling between the antenna system and nearby objects may not impact or may have less of an impact on the phase modulation accuracy of the second spatial layer.

According to aspects of the present disclosure, a UE may include two antennas, a single transmit RF chain, and a smart switching circuit (e.g., smart RF switching circuit). The UE may emulate the Alamouti STBC by feeding a corrected phase of the first spatial layer into the single RF chain, power-splitting, and analog phase adjusting the input signal into multiple signals (via distributed or lumped RF components) prior to driving the antennas with the adjusted replicas of the first spatial layer.

Figure 4:
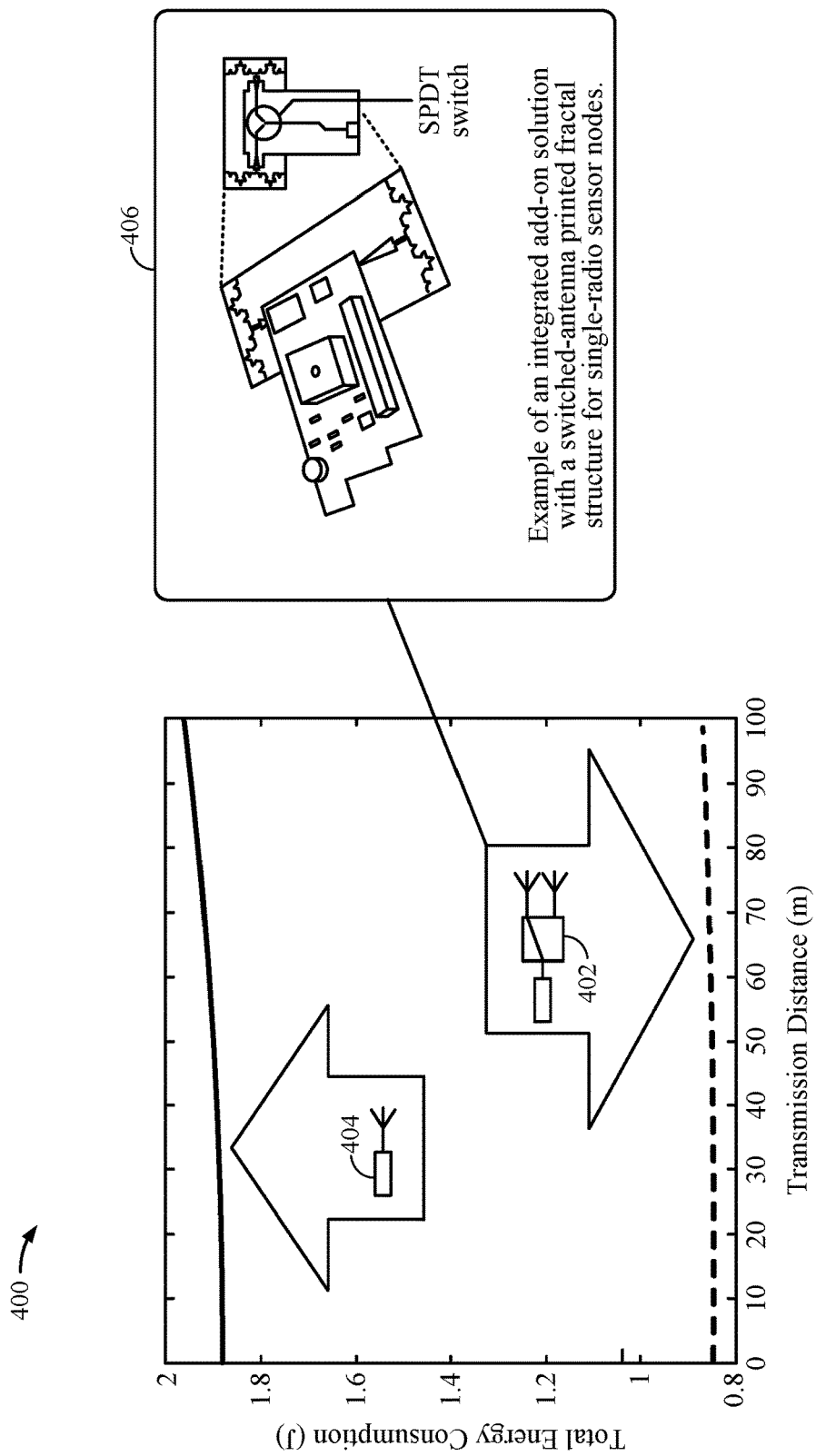
FIG. 4 illustrates an example of energy consumption by two UEs.

FIG. 4 illustrates an example 400 of energy consumption, in accordance with aspects of the present disclosure. In FIG. 4, the y-axis represents total energy consumption in joules and the x-axis represents a transmission distance in meters. 402 illustrates a UE having a single transmit RF chain, two antennas, and a smart switching circuit which couples an output of the single RF chain to one of the two antennas, in accordance with aspects of the present disclosure. 404 illustrates a UE having a single RF chain and antenna. As illustrated, the UE 402 having a single transmit RF chain, smart witching circuit, and two antennas consumes less energy as compared to the UE having a single RF chain and single antenna 404.

As shown at 406, the UE 402 may include a switched-antenna printed fractal structure for single radio sensor nodes, which may include a single-pole, double-throw (SPDT) switch.

Figure 5:
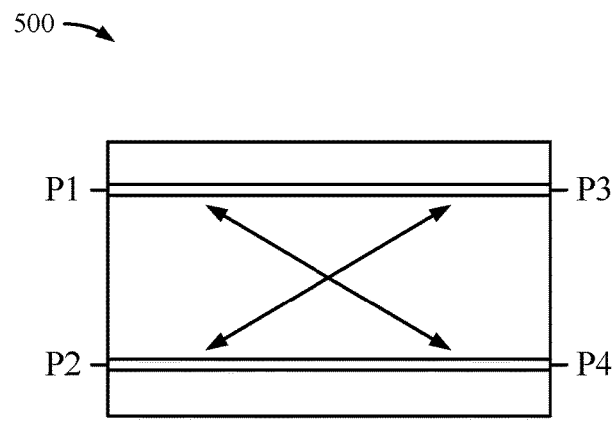
FIG. 5 illustrates an example hybrid coupler.

FIG. 5 illustrates an example hybrid coupler 500. A hybrid coupler is one example of an analog modulator circuit. A hybrid coupler is a four-port device that is used either to equally split an input signal with a phase shift between output ports or to combine two signals while maintaining high isolation between the ports. A hybrid coupler is an example of a directional coupler. As illustrated, the hybrid coupler has a first input port P1 and a second input port P2. The hybrid coupler also has a first output port P3 and a second output port P4. The hybrid coupler will split a signal into two equal copies or two equal, but antipodal copies (meaning the two copies are phase shifted, for example, by 180°).

FIG. 6 illustrates example relationships 600 between input and output signals of a hybrid coupler. At 602 and 604, the input signal is applied to P1 while P2 is terminated (e.g., P2 is coupled to a reference potential or electrical ground). The outputs of 602 and 604, at P3 and P4, are identical copies of half-power of the input signal. For example, at 602, x1 is input to P1 while P2 is terminated. The outputs at P3 and P4 are identical copies of x1 at half power. Similarly, at 604, −x1 is input to P1 while P2 is terminated. The outputs at P3 and P4 are identical copies of −x1 at half power.

At 606 and 608, the input signal is applied to P2 while P1 is terminated (e.g., P1 is coupled to a reference potential or electrical ground). The outputs of 606 and 608, at P3 and P4, are antipodal copies at half-power of the input signal. For example, at 606, x1 is input to P2 while P1 is terminated. The output is x1/√2 at P3 and −x1/√2 at P4. At 608, −x1 is input to P2 while P1 is terminated. The output is −x1/√2 at P3 and x1/√2 at P4.

BPSK is a modulation scheme that conveys data by modulating the phase of a reference signal. BPSK, sometimes referred to as phase reversal keying, is the simplest form of phase shift keying (PSK). BPSK uses two phases, which are separated by 180°. Thus, BPSK may be termed 2-PSK. According to one example, the constellation points are positioned on an axis at 0° and 180°.

The Alamouti scheme for two BPSK signals is shown below in Equation (1) for time and space. By observing the outputs compared to the input, the codeword X for the transmit diversity scheme may be constructed as shown below. Since the BPSK modulation scheme does not have use conjugation of x1, the outputs may be x1, x2, −x1, or −x2, which may be obtained with a hybrid coupler receiving a single input as shown in FIG. 6. The first column represents time symbol 1 and the second column represents time symbol 2. The first row represents a BPSK spatial layer 1 and the second row represents a BPSK spatial layer 2.

$$X = \frac{1}{\sqrt{2}}\begin{bmatrix} x1 & -x2 \\ x2 & x1 \end{bmatrix} \quad (1)$$

Based on the input, the switcher may route the RF output signal to either the first or second input port of an analog modulator circuit, such as a hybrid coupler. In this manner, the code word for the Alamouti scheme for BPSK may be generated using a single RF chain and two antennas. Similarly, this idea may be extended to a QPSK modulation scheme by having the first smart switcher coupled to a first hybrid coupler for receiving an in-phase signal and a second smart switcher coupled to a second hybrid coupler for receiving a quadrature-phase signal before the antenna stage.

Referring to the BPSK modulation scheme, symbol x2 can have one of two possible values, either equal to symbol x1 or symbol −x1. The smart switcher may route the output of the RF chain based on whether a first bit modulated into a constellation symbol (x1) of the BPSK modulation scheme equals a second bit modulated into a second constellation symbol (x2) of the BPSK modulation scheme.

Assuming b1 is the bit that is modulated into BPSK symbol x1 and b2 is the bit that is modulated into BPSK symbol x2 then two matrices may be created, one for x2=x1 and one for x2=−x1.

Using the constructed codeword X provided above, x2 may be replaced with x1 to obtain the codeword X1 and x2 may be replaced with −x1 to obtain the codeword X2.

$$\text{if } x2 = x1, X1 = \frac{1}{\sqrt{2}}\begin{bmatrix} x1 & -x1 \\ x1 & x1 \end{bmatrix} \quad (3)$$

$$\text{if } x2 = -x1, X2 = \frac{1}{\sqrt{2}}\begin{bmatrix} x1 & x1 \\ -x1 & x1 \end{bmatrix} \quad (4)$$

Given the behavior of the hybrid coupler, to create the first column of X1, P1 is fed with x1 while P2 is terminated (e.g., 602 in FIG. 6). Similarly, to create the second column of X1, P2 is fed with −x1 while P1 is terminated (e.g., 608 in FIG. 6).

To create the first column of X2, P2 is fed with x1 while P1 is terminated (e.g., 606 in FIG. 6). Similarly, to create the second column of X2, P1 is fed with x1 while P2 is terminated (e.g., 602 in FIG. 6).

Figure 7:
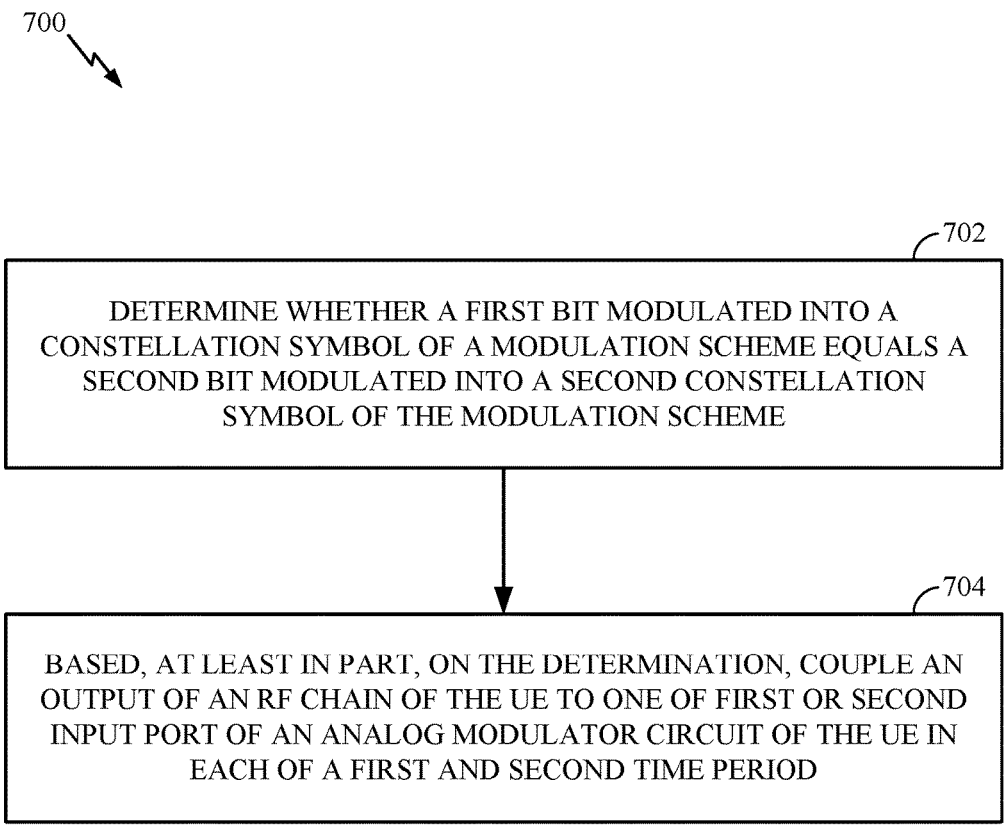
FIG. 7 illustrates example operations which may be performed by a wireless communication device.

FIG. 7 illustrates example operations 700, which may be performed by a wireless communication device, such as a UE, in accordance with aspects of the present disclosure. The UE may be the same as or similar to the UEs 102a-i of FIG. 1 or UE 120m-x of FIG. 2. The UE may include a smart switcher, at least one analog modulator circuit, and two antennas, as illustrated in FIG. 8.

At 702, the UE may determine whether a first bit (b1) modulated into a constellation symbol (x1) of a modulation scheme equals a second bit (b2) modulated into a second constellation symbol (x2) of the modulation scheme. According to aspects, the comparison may be performed by a digital signal processor (DSP) of the UE.

The UE (e.g., switching circuit of the UE) may operate in a first mode when the first bit equals the second bit and the UE may operate in a second mode when the first bit does not equal the second bit. For example, when b1=b2, the UE may operate in the first mode where the smart switcher is used to construct the codeword X1. When b1≠b2, the UE may operate in the second mode where the smart switcher is used to construct the codeword X2.

Based, at least in part, on the determination at 702, at 704, the UE may couple an output of an RF chain to one of first or second input ports of an analog modulator circuit in each of a first and second time period (e.g., time interval, symbol period, time symbol, time instance, symbol). For example, the switcher may route the signal from the RF chain to one of the first or second input ports of the analog modulator circuit in a given time interval.

As an example, when b1=b2 and the UE is operating in the first mode, the smart switcher may route signals in accordance with the codeword provided in X1. Accordingly, during a first time period (e.g., time symbol 1), the switching circuit may couple the output of the RF chain to the first input port. The switching circuit may input the first bit to the first input port. The second input port may be terminated.

In a second time period (e.g., time symbol 2), the switching circuit may couple the output of the RF chain to the second input port. The switching circuit may input an inverse of the first bit to the second input port. The first input port may be terminated.

When b1≠b2 and the UE is operating in the second mode, the smart switcher may route signals in accordance with the codeword provided in X2. Accordingly, in a first time period (e.g., time symbol 1), the switching circuit may couple the output of the RF chain to the second input port. The switching circuit may input the first bit to the second input port. The first input port may be terminated.

In a second time period (e.g., time symbol 2), the switching circuit may couple the output of the RF chain to the first input port. The switching circuit may input the first bit to the first input port. The second input port may be terminated.

FIG. 8 illustrates an example implementation 800 of aspects described herein. As discussed above, instead of a UE having a first transmit chain (A) and a second transmit chain (B), the UE may advantageously have a single RF transmit chain. The output of the RF transmit chain 806 ("signal in") may be input to a smart switching circuit 802.

The switching circuit 802 will drive one of the input ports of the analog modulator, such as a hybrid coupler 804, with either x1 or an inverse of x1 (e.g., −x1) in each of a first and second time period depending the desired Alamouti codeword. In this manner, the UE may derive power saving by emulating the Alamouti scheme using a single RF source.

FIG. 9 illustrates an example implementation 900 of aspects described herein. As noted above, the described power saving scheme may be extended to a QPSK complex modulation scheme. QPSK is a form of PSK in which two bits are modulated at once, selecting one of four possible carrier phase shifts. Each of the I and Q components may be BPSK modulated resulting in a QPSK signal.

According to an example, a first analog modulator circuit may be used for the I-component and a second analog modulator circuit may be used for the Q-component of the signal. The Alamouti codeword for the I-component may be represented as:

$$X = \begin{bmatrix} I1 & -I2 \\ I2 & I1 \end{bmatrix} \quad (5)$$

The Alamouti codeword for the Q-component may be represented as:

$$Y = \begin{bmatrix} Q1 & Q2 \\ Q2 & -Q1 \end{bmatrix} \quad (6)$$

Similar to the BPSK method described above, the I-component of x2 has two possible values, either being equal to the I-component of x1 or not being equal to the I-component of x1. The Q-component of x2 has two possible values, either being equal to the Q-component of x1 or not being equal to the Q-component of x1.

Assuming that b1 and b2 are the two bits that will be modulated into I1 and I2 and d1 and d2 are the two bits that will be modulated into Q1 and Q2, then two matrices may be created for each codeword. A matrix may be created for each of I2=I1 and I2=−I1 using the constructed codeword X provided above. Similarly, a matrix may be created for each of Q2=Q1 and Q2=−Q1 using the constructed codeword Y provided above.

For example, using the codeword X, I2 may be replaced with I1 to obtain the codeword X1 and I2 may be replaced with to obtain the codeword X2.

$$\text{if } I2 = I1, X1 = \begin{bmatrix} I1 & -I1 \\ I1 & I1 \end{bmatrix} \quad (7)$$

$$\text{if } I2 = -I1, X2 = \begin{bmatrix} I1 & I1 \\ -I1 & I1 \end{bmatrix} \quad (8)$$

Using the codeword Y, Q2 may be replaced with Q1 to obtain the codeword Y1 and Q2 may be replaced with −Q1 to obtain the codeword Y2.

$$\text{if } Q2 = Q1, Y1 = \begin{bmatrix} Q1 & Q1 \\ Q1 & -Q1 \end{bmatrix} \quad (9)$$

$$\text{if } Q2 = -Q1, Y2 = \begin{bmatrix} Q1 & -Q1 \\ -Q1 & -Q1 \end{bmatrix} \quad (10)$$

Given the behavior of the hybrid coupler as shown in FIG. 6, the set-up 602 may create the first column of X1 and the setup 608 may create the second column of X2. The set-up 606 may create the first column of X2 and the set-up 602 may create the second column of X2.

The set-up 602 may create the first column of Y1 and the setup 606 may create the second column of Y1. The set-up 606 may create the first column of Y2 and the set-up 604 may create the second column of Y2.

The goal is to spatially multiplex I1+jQ1 with I2+jQ2 in order to emulate the Alamouti Code using a single RF chain that will be driven by I1+jQ1. I1+jQ1 is power-split and phase shifted such that the output is X+jY, where X and Y are the Alamouti code words as shown in (5) and (6) above.

FIG. 9 is an extension of FIG. 8, wherein a UE has a second smart switcher circuit driving a second analog modulator. The output from port P3 of the first hybrid coupler 906 may be combined with the output from port P3 of the second hybrid coupler 908 via a combiner 910. The output from port P4 may be combined with the output from port P4 of the second hybrid coupler 908 via a combiner 912. During each time period), the combiners 910 and 912 may combine outputs from the first and second hybrid couplers 906, 908 to provide an input to the first and second antennae 914 and 916, respectively.

Based on determining that b1=b2, a first smart switcher 902 may drive one of the input ports of a first analog modulator, such as a hybrid coupler 906, with either I1 or an inverse of I1 (e.g., −I1) in each of a first and second time periods depending the desired Alamouti codeword.

Based on determining that d1=d2, a second smart switcher 904 may drive one of the input ports of a second analog modulator, such as a hybrid coupler 908, with either Q1 or an inverse of Q1 (e.g., −Q1) in each of a first and second time periods depending the desired Alamouti codeword. In each time period, the combiner 910 and 912 may combine the outputs of the first and second analog modulators.

The desired Alamouti codewords X1, X2, Y1, and Y2 are provided above.

As an example, if b1=b2 and d1=d2, the desired codewords are X1 and Y1. Based on the behavior of the hybrid couplers, during a first time period, I1 is fed into P1 of the first hybrid coupler 906 and Q1 is fed into P1 of the second hybrid coupler 908. During a second time period, −I1 is fed into P2 of the first hybrid coupler 906 and Q1 is fed into P2 of the second hybrid coupler 908.

If b1=b2 and d1≠d2, during a first time period, I1 is fed into P1 of the first hybrid coupler 906 and Q1 is fed into P2 of the second hybrid coupler 908. During a second time period, is fed into P2 of the first hybrid coupler 906 and −Q1 is fed into P1 of the second hybrid coupler 908.

If b1≠b2 and d1=d2, during a first time period, I1 is fed into P2 of the first hybrid coupler 906 and Q1 is fed into P1 of the second hybrid coupler 908. During a second time period, I1 is fed into P1 of the first hybrid coupler 906 and Q1 is fed into P2 of the second hybrid coupler 908.

If b1≠b2 and d1≠d2, during a first time period, I1 is fed into P2 of the first hybrid coupler 906 and Q1 is fed into P2 of the second hybrid coupler 908. During a second time period, I1 is fed into P1 of the first hybrid coupler 906 and −Q1 is fed into P1 of the second hybrid coupler 908.

In this manner, two analog modulators may be used to achieve power savings for a QPSK signal.

The techniques described herein may enhance the BLER of a UE having a single transmit RF chain and make the UE's performance comparable to a wireless device equipped with two RF transmit chains. Additionally, modulation is performed in the analog domain in the RF stage, not at the antenna stage such that the modulation is not sensitive to environmental or locational impacts (a user's hand, head, etc.). By switching signal routing in the RF domain (in the RF circuit), the classical dual-radio, dual-antenna may be emulated using a single radio, dual antenna UE.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254 of the UE 120 depicted in FIG. 2, the transceiver front end 222 of the access point 110 shown in FIG. 2, or the transceiver front end 300 illustrated in FIG. 3) and/or an antenna (e.g., the antennas 252ma through 252mu of the UE 120m portrayed in FIG. 2, the antennas 224a through 224ap of the access point 110 illustrated in FIG. 2, or the antenna 303 of the transceiver front end 300 depicted in FIG. 3). Means for receiving may comprise a receiver (e.g., the transceiver front end 254 of the UE 120 depicted in FIG. 2, the transceiver front end 222 of the access point 110 shown in FIG. 2, or the transceiver front end 300 illustrated in FIG. 3) and/or an antenna (e.g., the antennas 252ma through 252mu of the UE 120m portrayed in FIG. 2, the antennas 224a through 224ap of the access point 110 illustrated in FIG. 2, or the antenna 303 of the transceiver front end 300 depicted in FIG. 3). Means for determining and means for coupling may comprise a processing system, which may include one or more processors (e.g., the RX data processor 270, the TX data processor 288, and/or the controller 280 of the UE 120 illustrated in FIG. 2). Furthermore, the recited means may include one or more smart switchers and/or one or more analog modulator circuits in the front end 254 and/or interface 306.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node (e.g., a UE or a network component). The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication comprising:
   a radio frequency (RF) chain;
   a switching circuit, wherein an output of the RF chain is coupled to an input of the switching circuit;
   a first analog modulator circuit comprising a first and second input port, wherein an output of the switching circuit is coupled to an input of the first analog modulator circuit; and
   a first and second antennae coupled to an output of the first analog modulator circuit,
   wherein the switching circuit is configured to couple the output of the RF chain to one of the first or second input ports and wherein the switching circuit is configured to couple the output of the RF chain to one of the first or second input ports based, at least in part, on whether a first bit modulated into a constellation symbol of a modulation scheme equals a second bit modulated into a second constellation symbol of the modulation scheme.

2. The apparatus of claim 1, wherein the switching circuit is configured to operate in a first mode when the first bit equals the second bit and the switching circuit is configured to operate in a second mode when the first bit does not equal the second bit.

3. The apparatus of claim 2, wherein in the first mode of operation:
   in a first time period, the switching circuit couples the output of the RF chain to the first input port, and
   in a second time period, the switching circuit couples the output of the RF chain to the second input port.

4. The apparatus of claim 3, wherein:
   in the first time period, the switching circuit inputs the first bit to the first input port; and
   in the second time period, the switching circuit inputs an inverse of the first bit to the second input port.

5. The apparatus of claim 2, wherein in the second mode of operation:
   in a first time period, the switching circuit couples the output of the RF chain to the second input port, and
   in a second time period, the switching circuit couples the output of the RF chain to the first input port.

6. The apparatus of claim 5, wherein:
   in the first time period, the switching circuit inputs the first bit to the second input port; and
   in the second time period, the switching circuit inputs the first bit to the first input port.

7. The apparatus of claim 1, wherein the modulation scheme comprises Binary phase-shift keying (BPSK) modulation scheme.

8. The apparatus of claim 1, wherein the analog modulator circuit comprises a hybrid coupler.

9. An apparatus for wireless communication comprising:
   a radio frequency (RF) chain;
   a switching circuit, wherein an output of the RF chain is coupled to an input of the switching circuit;
   a first analog modulator circuit, wherein an output of the switching circuit is coupled to an input of the first analog modulator circuit;
   a first and second antennae coupled to an output of the first analog modulator circuit;
   a second analog modulator circuit, wherein a first output of the second analog modulator circuit is coupled to a first output of the first analog modulator circuit and a second output of the second analog modulator circuit is coupled to a second output of the first analog modulator circuit; and
   a second switching circuit coupled to the output of the RF chain, wherein an output of the second switching circuit is coupled to an input of the second analog modulator circuit, and in each time period, an in-phase component of the output of the RF chain is coupled to the input of the first analog modulator circuit and a quadrature-phase component of the output of the RF chain is coupled to an input of the second analog modulator.

10. A method for wireless communication by a user equipment (UE), comprising:
    determining whether a first bit modulated into a constellation symbol of a modulation scheme equals a second bit modulated into a second constellation symbol of the modulation scheme; and
    based, at least in part, on the determination, coupling an output of a radio frequency (RF) chain of the UE to one of first or second input port of an analog modulator circuit of the UE in each of a first and second time period.

11. The method of claim 10, wherein the UE operates in a first mode when the first bit equals the second bit and the UE is configured to operate in a second mode when the first bit does not equal the second bit.

12. The method of claim 11, further comprising, in the first mode of operation:
    in the first time period, coupling the output of the RF chain to the first input port; and
    in a second time period, coupling the output of the RF chain to the second input port.

13. The method of claim 12, further comprising:
    in the first time period, inputting the first bit to the first input port; and
    in the second time period, inputting an inverse of the first bit to the second input port.

14. The method of claim 11, further comprising, in the second mode of operation:
    in a first time period, coupling the output of the RF chain to the second input port; and
    in a second time period, coupling the output of the RF chain to the first input port.

15. The method of claim 14, further comprising:
    in the first time period, inputting the first bit to the second input port; and
    in the second time period, inputting the first bit to the first input port.

16. An apparatus for wireless communication by a user equipment (UE), comprising:
    means for determining whether a first bit modulated into a constellation symbol of a modulation scheme equals a second bit modulated into a second constellation symbol of the modulation scheme; and
    based, at least in part, on the determination, means for coupling an output of a radio frequency (RF) chain of the UE to one of first or second input port of an analog modulator circuit of the UE in each of a first and second time period.

17. The apparatus of claim 16, wherein the first bit equals the second bit, and further comprising:
    in the first time period, means for coupling the output of the RF chain to the first input port; and
    in a second time period, means for coupling the output of the RF chain to the second input port.

18. The apparatus of claim 16, wherein the first bit does not equal the second bit, and further comprising:
    in a first time period, means for coupling the output of the RF chain to the second input port; and in a second time period, means for coupling the output of the RF chain to the first input port.

\* \* \* \* \*